United States Patent [19]

Kelsey

[11] Patent Number: 5,312,794
[45] Date of Patent: May 17, 1994

[54] CATALYST SYSTEM FOR OLEFIN POLYMERIZATION

[75] Inventor: Donald R. Kelsey, Fulshear, Tex.

[73] Assignee: Shell Oil Company, Houston, Tex.

[21] Appl. No.: 998,082

[22] Filed: Dec. 29, 1992

[51] Int. Cl.$^5$ ............................................. C08F 4/69
[52] U.S. Cl. .................... 502/117; 502/102; 502/164; 502/167
[58] Field of Search ............... 502/102, 117, 164, 167

[56] References Cited

U.S. PATENT DOCUMENTS

| | | | |
|---|---|---|---|
| 4,729,976 | 3/1988 | Sjardijn et al. | |
| 5,071,812 | 12/1991 | Kelsey . | |
| 5,081,208 | 1/1992 | Sjardin | 502/102 X |
| 5,095,082 | 3/1992 | Kelsey . | |
| 5,143,992 | 9/1992 | Kelsey . | |
| 5,194,534 | 3/1993 | Bell | 502/117 X |
| 5,218,065 | 6/1993 | Kelsey et al. | 502/102 X |

OTHER PUBLICATIONS

L. L. Blosch et al, *J. Am. Chem. Soc.*, 113, 7066-7068 (1991).
M. Millar, *J. Am. Chem. Soc.*, 104, 288-289 (1982).
S. Trofimenko, *Inorg. Chem.*, 10, 504-507 (1971).
A. A. Eagle et al., *J. Chem. Soc., Chem. Commun.*, 1746-8 (1991).
Webster's New Collegiate Dictionary, p. 914, Pub. by G & C Merriam Co. (1981).

*Primary Examiner*—Patrick P. Garvin

[57] ABSTRACT

A catalyst system and process for the polymerization of cyclic olefins, such as dicyclopentadiene, are disclosed. The catalyst system contains a transition metal hydrotrispyrazolylborate complex having the formula:

$$Tp\text{-}M\text{-}L_3$$

wherein Tp is a hydrotrispyrazolylborate ligand, M is tungsten or molybdenum, and L is independently a ligand selected from the group consisting of oxo, phenoxy, alkoxy, and halides, provided that at least one L is a halide, and a co-catalyst.

9 Claims, No Drawings

CATALYST SYSTEM FOR OLEFIN POLYMERIZATION

FIELD OF INVENTION

This invention relates to a process for the ring-opening metathesis polymerization of cyclic olefins and to an olefin metathesis catalyst system employed therein. In a specific aspect, the invention relates to a group VIB metal compound-containing catalyst system for metathesis polymerization.

BACKGROUND OF THE INVENTION

Cyclic olefins are subjected to ring-opening metathesis polymerization to produce thermoplastic and thermoset polymers having physical properties which make them suitable for structural and electronic applications, such as molded plastic items and electrical laminates. Such polymerizations are commonly carried out in reaction injection molding (RIM) processes, in which a metathesis catalyst and a cyclic olefin monomer are charged to a heated mold, and polymerization of the monomer and forming of the polymer into the desired shape are carried out simultaneously in the mold.

In such RIM processes, it is important that the polymerization reaction occur rapidly and with as complete incorporation of the charged monomers as possible. For example, the presence of unreacted monomers in molded polydicyclopentadiene has been found to result in a molded part with an unpleasant odor, and less than optimum physical properties. Finding a RIM process that reacts in as short a cycle time as possible and at mold temperatures at or near room temperature is economically desirable. Further, it is desirable in such a system to have catalyst systems which are thermally stable and resistant to reaction with oxygen and water.

For most cyclic olefin metathesis catalyst systems, the presence of reactive materials such as water and oxygen should be avoided because they foul the polymerization process. As a result, it is usually necessary to thoroughly dry the cyclic olefin monomers prior to contact with the polymerization catalyst, and to conduct the polymerization in an inert environment.

A tungsten(VI) oxo alkylidene complex with an aluminum chloride co-catalyst is disclosed in an article by J. A. Boncella et al., *J. Am. Chem. Soc.*, 113, 7066–7068 (1991) as an air and moisture-stable ring opening metathesis catalyst system However, alkylidene or alkylidyne complexes, e.g. W=CR or W≡CR, are generally difficult to manufacture and expensive. Therefore, it is desirable to produce a simpler and less expensive, air and moisture-stable ring opening metathesis catalyst system.

It is therefore an object of the present invention to provide an improved air and moisture-stable ring opening metathesis catalyst system.

SUMMARY OF THE INVENTION

According to the invention, a cyclic olefin polymerization catalyst system is provided, comprising a transition metal hydrotrispyrazolylborate complex and cocatalyst.

DETAILED DESCRIPTION OF THE INVENTION

The polymerization catalyst system described herein is reactive in the ring-opening metathesis polymerization of cyclic olefins. Ring-opening metathesis catalysts facilitate the breaking of the monomer ring at double bonds to form linear and crosslinked unsaturated polymers.

The Catalyst System

The polymerization catalyst system of this invention contains a transition metal hydrotrispyrazolylborate complex having the formula:

wherein Tp is a hydrotrispyrazolylborate ligand, M is tungsten or molybdenum, L is independently a ligand selected from the group consisting of oxo, phenoxy, alkoxy, pyrazole and halides provided that at least one L is a halide. Preferably, the anionic hydrotrispyrazolylborate ligand has the general formula

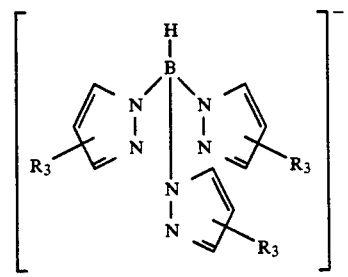

where R is independently selected from hydrogen and $C_{1-8}$ alkyl. Suitable transition metal hydrotrispyrazolylborate complex includes, for example, $TpWO_2Cl$, $TpWCl_3$, $TpMoCl_3$ and $TpMoOCl_2$. Preferably, Tp is the hydrotrispyrazolylborate ligand or the hydrotris(3,5-dimethylpyrazolyl)borate ligand.

These complexes can be prepared by reacting the trischelating monoanionic ligand such as KTp with a corresponding transition metal starting material having at least one halide ligand. Such transition metal starting material can be, for example, $MoCl_3(THF)_3$, $WCl_3(THF)_3$, $MoCl_5$, $WCl_6$ and $WO_2Cl_2$. Depending on the oxidation state of the reaction product, oxidation, such as by ceric ammonium nitrate or by controlled potential electrolysis, may be necessary to obtain the transition metal hydrotrispyrazolylborate complex useful for the inventive process. Alternatively, the transition metal-Tp halide complexes can be prepared by reacting a transition metal hydrotrispyrazolylborate carbonyl compound such as $(Et_4N)TpMo(CO)_3$ or $(Et_4N)TpW(CO)_3$ with thionyl chloride. Further, the oxo-containing complexes can be prepared by contacting the above transition metal-Tp halide complexes with alumina or with controlled amounts of oxygen or water. The preparation of these complexes are known and described further in M. Millar et al., *J. Am. Chem. Soc.*, 104, 288–289 (1982); S. Trofimenko, *Inorg. Chem.*, 10, 504 (1971); and A. A. Eagle et al., *J. Chem. Soc., Chem. Commun.*, 1746 (1991). The alkoxy or phenoxy-containing complexes can be prepared by contacting the above transition metal-Tp halide complexes with controlled amounts of alcohols, metal alkoxides (e.g. NaOEt or LiOEt) or optionally substituted phenolic compounds (e.g. alkyl or halide substituted) under conditions effective to react the hydroxyl group or the metal alkoxides with the halide ligands under inert atmosphere.

The catalyst system of the present invention further contains one or more co-catalysts for ring opening cycloolefin polymerization. Suitable co-catalyst include, for example, organoaluminum, organotin, organozinc, or borohydride compounds. In some instances, an additional cocatalyst or activator such as boron halides may be necessary.

Suitable organotin co-catalysts include, for example, an organo tin hydride compound, including compounds which can be represented by the formula $Sn(R')_3H$, in which each $R'$ is selected independently from hydrogen, substituted or unsubstituted aryl, or $C_{1-20}$ alkyl provided that at least one $R'$ is an alkyl or aryl. Specific examples of such organotin co-catalysts include triethyltin hydride, trimethyltin hydride, triisopropyltin hydride, tributyltin hydride, tripentyltin hydride, diphenyltin dihydride, trioctyltin hydride, ethylpropyloctyltin hydride, methyldicyclohexyltin hydride, cyclopentyldimethyltin hydride, triphenyltin hydride, phenyldimethyltin hydride, allyltin trihydride and 2-butenyltin trihydride. Tributyltin hydride, trioctyltin hydride, and triphenyltin hydride are preferred catalysts. Substituents on the $R'$ groups in the above formula can include, for example, $C_{1-20}$ alkoxy and halides.

Suitable organoaluminum co-catalyst includes, for example, trialkyl aluminum, alkylaluminum dihalides, dialkyl aluminum halides or alkyl(alkyloxy) aluminum halides. Specific examples of such organo aluminum co-catalysts include ethyl aluminum chloride, diethyl aluminum chloride, and trioctyl aluminum.

Suitable organozinc co-catalyst includes, for example, dialkyl zinc such as diethyl zinc and dioctyl zinc.

An example of a suitable borohydride co-catalyst, includes, for example, those compounds which can be represented by the formula $[Y+][BH_mZ_n]^-$, in which $Y+$ represents an organic or organometallic cationic counterion, Z is a substituent group such as alkyl, cyano, halide, and the like, $m>0$ and $m+n=4$. Particularly preferred are borohydrides represented by the formula $[R''_3P]_2[M+]BH_4$, in which each $R''$ is independently selected from $C_{1-20}$, preferably $C_{2-12}$, hydrocarbyl, preferably aryl. Examples of such borohydrides include transition metal-based borohydrides such as bis(triphenylphosphine) copper (I) borohydride and ammonium borohydrides such as bis(triphenylphosphoranylidene) ammonium borohydride.

Effectiveness of the borohydride depends to some extent on its solubility in the monomer to be polymerized. Borohydrides with poor solubility such as sodium triethyl borohydride, sodium borohydride and tetrabutyl ammonium borohydride are generally not active co-catalysts in non-polar cyclic olefins such as DCPD. Preferred borohydride cocatalysts, because of their activity in DCPD and similar monomers, are those represented by the above borohydride formula in which $m=4$, $n=0$ and $Y+$ includes aromatic groups such as triarylphosphine and tetraaryldiphosphine, such as 1,2-bis(diphenylphosphine)ethane, moieties.

As used herein, the catalyst system composition comprises the transition metal hydrotrispyrazolylborate complex and a co-catalyst and optionally a moderator or a boron halide promoter. The co-catalyst is present in the catalyst system composition in an amount effective to enhance the activity of the transition metal hydrotrispyrazolylborate complex, which will vary depending upon the specific components present and the reaction conditions. The transition metal hydrotrispyrazolylborate complexes are not by themselves metathesis catalysts. In general, the co-catalyst is present in a molar amount of from about 15:1 to about 1:1, preferably from about 8:1 to about 2:1, based on moles of transition metal catalyst.

The catalyst system may optionally include a moderator to delay the initiation of polymerization if the selected catalyst and co-catalyst cause instant polymerization upon contact. Ethers, esters, ketones, nitriles and polar cyclic olefins are among suitable moderators for catalyst systems comprising tungsten catalyst and alkyl aluminum co-catalyst. Ethyl benzoate, butyl ether bis(2-methoxyethyl) ether and polar cyclic olefins are preferred moderators. Moderators are generally not necessary for catalyst systems having a tin hydride or borohydride co-catalyst.

The catalyst system may also optionally include a boron halide promoter, including boron trihalides, boron trihalide complexes and tetrahaloborates. Preferably, a boron halide promoter is present when a organotin co-catalyst is used to promote the activity of the catalyst system. The boron promoter can be, for example, such boron halides as boron tribromide, boron trifluoride, boron trifluoride diethyl ether complex, boron trifluoride dibutyl ether complex, boron trifluoride ethylamine, tetrafluoroboric acid diethyl ether, methyl boron difluoride, phenyl boron dichloride, triphenylmethyl fluoroborate, ammonium tetrafluoroborate, bis(2-ethyl-1-hexyl)ammonium tetrafluoroborate, boron trichloride dimethylsulfide, boron trifluoride alcohol complexes, and the like. The boron compound can be present in the polymerization reaction mixture in an amount effective to promote polymerization of the cyclic olefin monomer, generally from about 0.01 to about 10 moles, preferably from about 0.05 to about 2 moles, per mole of transition metal. The optimum level will vary depending upon the catalyst and the cocatalyst, and amounts of boron halide above the optimum may inhibit polymerization. The presently-preferred boron halides, because of their high activity and stability, are boron trifluoride and its ether complexes.

The presently-preferred co-catalysts are organoaluminum compounds for their relative higher reactivity and organotin compounds with boron halide promoters for their moisture stability.

Polymerization

The polymerization process of the invention involves contacting one or more cyclic olefin monomers with the catalyst system composition under polymerization conditions.

As used herein, cyclic olefin monomers can be monomers or comonomers. Preferred cyclic olefin monomers include cyclic olefins containing a norbornene (bicyclo[2.2.]heptene) group which can be represented by the structural formulas:

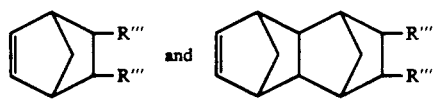

in which each $R'''$ is selected independently from hydrogen, $C_{1-20}$ alkyl, $C_{1-20}$ alkenyl, $C_{3-8}$ cycloalkyl, $C_{3-8}$ cycloalkenyl and $C_{6-20}$ aryl and, with $R'''$ groups linked together through carbon atoms, saturated and unsaturated cyclic hydrocarbon groups. Included in such monomers and comonomers are dicyclopentadiene, norbornene, norbornadiene, 5-(2-propenyl)norbornene, cyclohexenylnorbornene [5-(3-cyclohexen-1-yl)bicyclo[2.2.1]hept2-ene], and the like; and adducts of vinylcyclohydrocarbons, e.g. 4-vinylcyclohexene and cyclopentadiene or 3,5-divinylcyclopentene and cyclopentadiene and others as described in Kelsey, U.S. Pat. Nos. 5,095,082 and 5,143,992. Commercial cyclic olefins are available at various levels of purity, ranging from about 92 to about 99.9, the upper purity ranges being the result of distillation and further treatment for removal of contaminants and olefins which would be copolymerized under polymerization conditions. As a general rule, transition metal catalysts employing an alkyl aluminum compound as co-catalyst require a high-purity monomer for acceptable polymerization activity, while the use of a tin hydride or borohydride co-catalyst permits the use of lower purity, technical-grade (83–95%) dicyclopentadiene monomer. An advantage of the invention catalyst is that it is active in relatively impure (90–95%) dicyclopentadiene.

The ring-opening polymerization of the invention is conducted by contacting the cyclic olefin monomer and the catalyst system under polymerization conditions. It is, on some occasions, useful to provide an inert diluent in order to solubilize the catalyst system components, particularly when one of the catalyst component is not readily soluble in the cyclic olefin monomers such as TpWO$_2$Cl. The catalyst components will typically have the necessary solubility in the cyclic olefin monomer to be polymerized, and in the preferred embodiment no added diluent is employed (neat) and the catalyst system components and the cyclic olefin monomer are contacted directly. Suitable polymerization conditions for such contacting include a polymerization temperature of from about 20° C. to about 250° C. with polymerization temperatures from about 30° C. to about 150° C. being preferred. The polymerization pressure is that pressure required to maintain the polymerization mixture in a non-gaseous state. Such pressures will vary with the reaction temperature but pressures up to about 5 atmospheres are satisfactory and frequently ambient pressure is suitable and is preferred.

The inventive polymerization process is preferably carried out by reaction injection molding (RIM), in which a solution of the catalyst system, preferably in the monomer liquid to be polymerized, is injected into a mold simultaneously with the monomer, in liquid form, to be polymerized. The catalyst is generally employed in a molar ratio of RIM monomer to transition metal (mole:mole) of from about 200:1 to about 12,000:1, preferably about 500:1 to about 8000:1.

In an illustrative polymerization, the monomer and catalyst system are mixed at a relatively low temperature at which rapid polymerization does not occur. The relatively low reaction rate permits efficient mixing or other processing of the polymerization mixture including the incorporation of fillers, reinforcements, anti-oxidants, stabilizers, pigments, elastomers or other materials provided to influence the properties of the polymerization product.

A particularly contemplated embodiment of the process is in a reaction injection molding (RIM) process. Because of the relatively low initial rate of reaction, the monomer and catalyst system are mixed, typically by providing each component of the catalyst system with a portion of the cyclo olefinic monomer, and the mixture is then transferred (injected) to a suitable mold including those molds for the production of large castings of complex shape. Notwithstanding the low initial reaction rate, the mixing and transfer must be accomplished rather quickly, for in a typical RIM process, the mixing/transfer time is on the order of a few seconds. Moreover, shortly after mixing of the monomer and catalyst system, a significant reaction exotherm occurs which substantially increases the temperature of the polymerizing mixture. While such an exotherm is at least in part beneficial in that the time for polymerization in the mold is reduced, it also requires that processing of the polymerization mixture be rapidly completed.

In an alternative RIM polymerization technique, a stream of the transition metal catalyst component in the monomer to be polymerized and a monomer stream containing any cocatalyst employed are combined in the mixing head of a RIM machine just prior to injection of the combined stream into a mold. The boron halide promoter, if used, is injected into the mixing head with the transition metal stream, with the cocatalyst stream, or in a separate monomer solution stream.

The initial mold temperature will generally be within the range of about 20° to about 200° C., preferably about 30° to about 150° C. The mold pressure is generally within the range of about 10 to about 50 psi. After injection of the catalyst and monomer into the mold, there is typically an interval of time, called the "induction time," before onset of a rapid exotherm from the exothermic polymerization reaction. In a commercial RIM process, this induction time should be sufficiently long to permit filling of the mold, typically about 2 minutes, preferably less than thirty seconds. Once the polymerization reaction is initiated, polymerization should occur quite rapidly, usually within about 10 seconds to about 1 minute, and is accompanied by a rapid rise in temperature.

Alternatively, particularly when employing relatively large molds, a relatively long induction time of up to several minutes may be desirable to allow for filling of the mold prior to the onset of polymerization which, once initiated, may also take several minutes to complete.

Various optional components can be present in the reaction mixture during polymerization, including solvents, fillers, anti-oxidants, flame retardants, blowing agents, stabilizers, foaming agents, pigments, plasticizers, reinforcing agents and impact modifiers. Particularly preferred is the addition of from about 1 to about 10 weight percent, based on the weight of the monomer, of an elastomer for impact modification of the polymer. These components are most conveniently added to the reaction as constituents of one or more of the reaction mixture streams, as liquids or as solutions in the monomer.

After the polymerization reaction is complete, the molded object may be subjected to an optional post-cure treatment at a temperature in the range of about 100° to about 300° C. for about 1 to 24, preferably about 1 to 2 hours. Such a post-cure treatment can enhance certain polymer properties, including glass transition temperature.

The polymerized products of this invention are soluble linear thermoplastic polymers or hard, insoluble, crosslinked thermoset polymers having utility such as parts for cars, agriculture, housings for instruments or machines, in electronics, and marine applications.

Illustrative Embodiment

The following illustrative embodiments describe the inventive catalyst system and process of the invention and are provided for illustrative purposes and are not meant as limiting the invention.

EXAMPLES 1-6

A 30 mL dried, silanized serum bottle with a magnetic stir bar was charged with hydrotris(3,5-dimethylpyrazolyl)borate tungsten trichloride, boron trifluoride etherate (neat or as a 1 wt % solution in dicyclopentadiene), if used, and additional dry, degassed dicyclopentadiene such that the total amount of dicyclopentadiene in the final polymerization mixture after addition of cocatalyst was 16 g. A gas-tight syringe was loaded with a cocatalyst listed in Table 1 (neat or in solution) and the needle plugged with a rubber stopper. The serum bottle and syringe were then transferred to the hood. The serum bottle was connected to the purified argon supply via a Firestone valve and syringe needle and fitted with an 18 gauge vent needle and a 1/16 inch×3 inch stainless steel thermocouple protection tube (Omega) positioned near the center of the solution. The cocatalyst was then injected into the stirred solution at room temperature. The mixture was stirred for 20-30 seconds at room temperature, and then placed in an oil bath at 90° C. The temperature near the center of the reaction mixture was monitored by means of a K thermocouple probe (1/32 inch) inserted in the 1/16 inch tube. The onset (induction) and exotherm maximum times and temperatures were determined and listed in Table 1. When there was no measurable exotherm, the reactions were kept in the bath for at least 50 minutes.

hydrotris(3,5-dimethylpyrozolyl)borate tungsten dioxychloride similarly performed were unsuccessful due to the insolubility of the complex in the dicyclopentadiene monomer.

EXAMPLES 7-12

Experiments were carried out in a similar manner to Examples 1-6, except hydrotris(3,5-dimethylpyrozolyl)boratomolybdenum trichloride (Tp'MoCl$_3$ was used in Examples 7-9 and hydrotris(3,5-dimethylpyrozolyl)boratomolybdenum oxydichloride (Tp'MoOCl$_2$) was used in Examples 10-12. Ratio of catalyst components and results are shown in Table 2.

I claim:

1. A cyclic olefin polymerization catalyst system comprising:
   (a) a transition metal hydrotrispyrazolylborate complex having the formula:

$$Tp-M-L_3$$

wherein Tp is a hydrotrispyrazolylborate ligand, M is tungsten or molybdenum, and L is independently a ligand selected from the group consisting of oxo, phenoxy, alkoxy, pyrazole, and halides provided that at least one L is a halide; and
   (b) a co-catalyst for ring opening cycloolefin polymerization.

2. The catalyst system of claim 1 in which M is tungsten.

3. The catalyst system of claim 1 in which L is a halide.

4. The catalyst system of claim 1 in which Tp is a hydrotrispyrazolylborate having the formula

TABLE 1

| | DCPD/W | | Cocatalyst/W/BF$_3$[b] | Onset | | Exotherm Maximum | |
|---|---|---|---|---|---|---|---|
| Example | (mol/mol) | Cocatalyst[a] | (mol/mol/mol) | Time (min) | T (°C.) | Time (min) | T (°C.) |
| 1 | 1000/1 | TBTH | 4/1/1 | NE, some gel after 1.75 hours | | | |
| 2 | 1000/1 | none | -/1/2 | NE, some gel after 3 hours | | | |
| 3 | 500/1 | TBTH | 4/1/1 | 13.9 | 95 | 15.1 | 152 |
| 4 | 500/1 | none | -/1/2 | NR, liquid | | | |
| 5 | 500/1 | EACL | 4/1/- | 2.1 | 66 | 4.9 | 144 |
| 6 | 500/1 | TBTH | 4/1/- | NR | | | |

NE = no exotherm;
NR = no reaction.
[a]TBTH = tributyltin hydride; EACL = ethylaluminum dichloride.
[b]BF$_3$ dibutyl ether complex.

TABLE 2

| | DCPD/W | | Cocatalyst/W/BF$_3$[b] | Onset | | Exotherm Maximum | |
|---|---|---|---|---|---|---|---|
| Example | (mol/mol) | Cocatalyst[a] | (mol/mol/mol) | Time (min) | T (°C.) | Time (min) | T (°C.) |
| Tp'MoCl$_3$ | | | | | | | |
| 7 | 500/1 | TBTH | 4/1/1 | NR, no gel after 1 hour | | | |
| 8 | 500/1 | TBTH | 4/1/- | NR, no gel after .5 hour | | | |
| 9 | 500/1 | EACL | 6/1/- | | | 3 | 99.5[c] |
| Tp'MoOCl$_2$ | | | | | | | |
| 10 | 500/1 | TBTH | 4/1/1 | NR, liquid | | | |
| 11 | 500/1 | TBTH | 4/1/- | NR, liquid | | | |
| 12 | 500/1 | EACL | 6/1/- | | | 3.3 | 100[c] |

NE = no exotherm;
NR = no reaction.
[a]TBTH = tributyltin hydride; EACL = ethylaluminum dichloride.
[b]BF$_3$ dibutyl ether complex.
[c]solution after 1 hour.

As seen from the table, when both in hydride and boron halide are present with the Tp complex, dicyclopentadiene polymerized. Also, Tp complex with ethylaluminum dichloride as a co-catalyst polymerized rapidly. However, Tp complex combined with BF$_3$ etherate was not a good metathesis catalyst. An experiment with

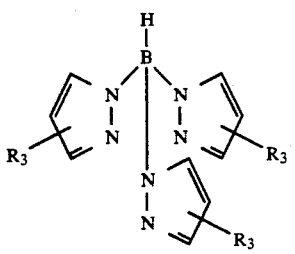

wherein R is independently selected from hydrogen and $C_{1-8}$ alkyl.

5. The catalyst system of claim 4 in which the cocatalyst is selected from the group consisting of organotin hydrides, borohydrides, orgamozinc and organoaluminum compounds.

6. The catalyst system of claim 5 in which the cocatalyst is a organotin hydride.

7. The catalyst system of claim 5 in which the cocatalyst is a organoaluminum compound.

8. The catalyst system of claim 6 further comprising a promoter to promote the activity of said catalyst system.

9. The catalyst system of claim 8 in which the promoter is a boron halide.

* * * * *